(12) United States Patent
Furutani

(10) Patent No.: US 9,664,416 B2
(45) Date of Patent: May 30, 2017

(54) METHOD FOR MANUFACTURING MIRROR STRUCTURE, MIRROR STRUCTURE, LIGHT COLLECTION DEVICE HAVING SAME, HEAT COLLECTION FACILITY, AND SOLAR THERMAL POWER GENERATION FACILITY

(71) Applicant: MITSUBISHI HEAVY INDUSTRIES, LTD., Minato-ku, Tokyo (JP)

(72) Inventor: Akira Furutani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 198 days.

(21) Appl. No.: 14/380,850

(22) PCT Filed: Mar. 21, 2013

(86) PCT No.: PCT/JP2013/058107
§ 371 (c)(1),
(2) Date: Aug. 25, 2014

(87) PCT Pub. No.: WO2013/146541
PCT Pub. Date: Oct. 3, 2013

(65) Prior Publication Data
US 2015/0007566 A1 Jan. 8, 2015

(30) Foreign Application Priority Data
Mar. 28, 2012 (JP) .................. 2012-074950

(51) Int. Cl.
*F03G 6/00* (2006.01)
*F24J 2/15* (2006.01)
(Continued)

(52) U.S. Cl.
CPC ......... *F24J 2/1057* (2013.01); *B32B 38/0012* (2013.01); *F03G 6/00* (2013.01);
(Continued)

(58) Field of Classification Search
CPC ......... F24J 2002/1014; F24J 2002/1023; F24J 2002/1052; F24J 2002/4676–2002/4679;
(Continued)

(56) References Cited

U.S. PATENT DOCUMENTS 4,124,277 A * 11/1978 Stang ................ B32B 17/10174
264/1.7
4,276,872 A * 7/1981 Blake ........................ F24J 2/16
126/578

(Continued)

FOREIGN PATENT DOCUMENTS

JP S53-004947 U 1/1978
JP S55-121208 U 8/1980
(Continued)

OTHER PUBLICATIONS

Australia Patent Office, "Notice of Acceptance for AU 2013242235," Sep. 18, 2015.
(Continued)

*Primary Examiner* — Laert Dounis
(74) *Attorney, Agent, or Firm* — Manabu Kanesaka; Benjamin Hauptman; Kenneth Berner

(57) ABSTRACT

A mirror (31) that reflects solar light, a rear plate (35) that supports a rear surface of the mirror (31), and a support frame (36) that is disposed on a rear surface of the rear plate (35) are prepared. Next, the rear plate (35) and the support frame (36) are joined to each other. Moreover, an adhesive agent is disposed between the mirror (31) and the rear plate (35), the mirror (31), the rear plate (35), and the support frame (36) are elastically deformed so that a reflecting surface of the mirror (31) forms a target three-dimensional curved surface, using a lower mold (51) and an upper mold (52), and the elastically deformed state is maintained until the adhesive agent is cured.

10 Claims, 12 Drawing Sheets

(51) Int. Cl.
*F24J 2/52* (2006.01)
*F24J 2/10* (2006.01)
*F24J 2/12* (2006.01)
*F24J 2/54* (2006.01)
*B32B 38/00* (2006.01)
*F03G 6/06* (2006.01)
*G02B 7/183* (2006.01)

(52) U.S. Cl.
CPC ............... *F03G 6/064* (2013.01); *F24J 2/12* (2013.01); *F24J 2/541* (2013.01); *B32B 2038/0076* (2013.01); *B32B 2307/416* (2013.01); *G02B 7/183* (2013.01); *Y02E 10/42* (2013.01); *Y02E 10/46* (2013.01); *Y02E 10/47* (2013.01); *Y10T 156/1048* (2015.01)

(58) Field of Classification Search
CPC ......... F24J 2002/5218; F24J 2002/5417; F24J 2002/5437; F24J 2002/5482; F24J 2/12; F24J 2/125; F24J 2/38; F24J 2/407; F24J 2/06; F24J 2/1057
USPC .................... 126/686, 688–691; 29/890.033; 359/846, 883
See application file for complete search history.

(56) References Cited

U.S. PATENT DOCUMENTS

| | | | | |
|---|---|---|---|---|
| 4,435,043 | A | * | 3/1984 | Mertens ..................... F24J 2/10 126/684 |
| 4,465,734 | A | * | 8/1984 | Laroche ............. B29C 44/1233 156/222 |
| 7,550,054 | B2 | * | 6/2009 | Lasich ............. B29D 11/00596 126/573 |
| 2011/0132433 | A1 | * | 6/2011 | Tanaka ..................... F16H 1/32 136/246 |
| 2013/0061909 | A1 | * | 3/2013 | Jacquot .................. F24J 2/5205 136/246 |

FOREIGN PATENT DOCUMENTS

| | | | |
|---|---|---|---|
| JP | S58-035359 A | | 3/1983 |
| JP | S58-35360 A | | 3/1983 |
| JP | S58-054038 U | | 4/1983 |
| JP | S59-029203 A | | 2/1984 |
| JP | S63-223601 A | | 9/1988 |
| JP | 07209508 A | * | 8/1995 |
| JP | 2003-124741 A | | 4/2003 |
| JP | 2004-037037 A | | 2/2004 |
| JP | 2009-139761 A | | 6/2009 |
| JP | 2010-019468 A | | 1/2010 |
| JP | 2010-019999 A | | 1/2010 |
| JP | 2010-101462 A | | 5/2010 |
| JP | 2013-204719 A | | 10/2013 |
| JP | 2013-205643 A | | 10/2013 |
| WO | 2007/034717 A1 | | 3/2007 |
| WO | WO 2009133750 A1 | * | 11/2009 ............... F24J 2/542 |
| WO | WO 2011045539 A2 | * | 4/2011 ............. F24J 2/5205 |

OTHER PUBLICATIONS

PCT, "International Search Report for PCT/JP2013/058107," Jun. 25, 2013.
PCT, "Written Opinion of the International Searching Authority for PCT/JP2013/058107," Jun. 25, 2013.

* cited by examiner

METHOD FOR MANUFACTURING MIRROR STRUCTURE, MIRROR STRUCTURE, LIGHT COLLECTION DEVICE HAVING SAME, HEAT COLLECTION FACILITY, AND SOLAR THERMAL POWER GENERATION FACILITY

RELATED APPLICATIONS

The present application is National Phase of International Application No. PCT/JP2013/058107 filed Mar. 21, 2013, and claims priority from Japanese Application No. 2012-074950, filed Mar. 28, 2012.

TECHNICAL FIELD

The present invention relates to a method for manufacturing a mirror structure that reflects solar light, a mirror structure, a light collection device having the same, a heat collection facility, and a solar thermal power generation facility.

Priority is claimed on Japanese Patent Application No. 2012-074950, filed Mar. 28, 2012, the content of which is incorporated herein by reference.

BACKGROUND ART

In recent years, from the viewpoint of prevention of global warming and usage restraint of fossil fuels, solar light energy is focused on as natural energy which exhausts a small amount of toxic substances such as carbon dioxide or nitrogen oxide or as a renewable energy resource.

For example, as a facility using the solar light energy, there is a heat collection facility that includes a light collection device having a mirror and a heat receiver that receives light from the mirror.

For example, as the light collection device in the heat collection facility, there is a light collection device disclosed in PTL 1 described below.

The light collection device includes a mirror structure having a plurality of mirrors, and a driving device that coordinates the mirrors of the mirror structure in a target direction. The mirror structure includes the plurality of mirrors, and includes a laminate sheet adhering to a rear surface of each mirror, a truss structure that is disposed on the rear surface side of the laminate sheet, and a spacer piece that is disposed between the laminate sheet and the truss structure and maintains a curved surface of the mirror.

In order to improve weight reduction of the mirror structure, in the mirror structure, a deformable and thin mirror is used, and the mirror is supported so as not to be deformed by the spacer piece and the truss structure configuring a rigid body.

CITATION LIST

Patent Literature

[PTL 1] Japanese Unexamined Patent Application Publication No. 58-35359

SUMMARY OF INVENTION

Technical Problem

However, in the above-described mirror structure, since the deformable and thin mirror is supported by the spacer piece and the truss structure, the mirror structure is not deformed before and after the mirror structure is completed, and due to the existence of the spacer piece and the truss structure uniquely having high stiffness, the weight of the mirror structure is increased. Accordingly, there are problems in that not only are transport or field assembly of the mirror structure not easily performed, but a driving force is also increased when the mirror structure is directed to the target direction.

Accordingly, an object of the present invention is to provide a method for manufacturing a mirror structure, a mirror structure, a light collection device having the same, a heat collection facility, and a solar thermal power generation facility which can improve weight reduction of a mirror structure, can allow transport or field assembly to be easily performed, and can decrease a driving force when a mirror structure is directed to a target direction.

Solution to Problem

According to an aspect of the present invention, there is provided a method for manufacturing a mirror structure that reflects solar light and radiates the solar light to a heat receiver, the method including: a preparation step of preparing a mirror that reflects the solar light, a rear plate that supports the mirror, and a support frame that is disposed on a rear surface of the rear plate; a joining step of joining the rear plate and the support frame; and a adherence step of disposing an adhesive agent between the mirror and the rear plate, of elastically deforming the mirror, the rear plate, and the support frame so that a reflecting surface of the mirror forms a target three-dimensional curved surface, and of maintaining the elastically deformed condition until the adhesive agent is cured.

In the method for manufacturing, the elastically deformed states of the mirror, the rear plate, and the support beam member are maintained by the curing of the adhesive agent, one rigid body in which the mirror, the rear plate, and the support frame are integrally formed is configured. That is, in the method for manufacturing, in the step in which the mirror, the rear plate, and the support frame are integrated with one another, the stiffness of the mirror structure is initially secured.

Accordingly, in the method for manufacturing, each of the mirror, the rear plate, and the support frame does not need high stiffness, and thus, weight reduction of the mirror structure can be improved.

Here, in the method for manufacturing a mirror structure, in the adherence step, a curved surface corresponding to the target three-dimensional curved surface may be formed using a first mold that contacts the mirror and a second mold that contacts the rear plate and the support frame.

At this time, in the preparation step, a plurality of mirrors and rear plate for each of the plurality of mirrors may be prepared, and in the adherence step, shapes of the reflecting surfaces of the plurality of mirrors may be formed so that a portion of the target three-dimensional curved surface is formed on all reflecting surfaces of the plurality of mirrors, using the first mold that contacts the plurality of mirrors and the second mold that contacts the plurality of rear plates and the support frame.

In the method for manufacturing, compared to a case where the plurality of mirrors having the target three-dimensional curved surface previously are attached to the support frame or the like, even when the target three-dimensional curved surface is formed on the reflecting surfaces of the plurality of mirrors, labor processing of each mirror can be omitted. Moreover, the direction or the positional adjustment of each mirror with respect to the support frame can be performed extremely easily, and thus, the manufacturing step can simplified. In addition, the target three-dimensional curved surface can be formed very accurately on the reflecting surfaces of the plurality of mirrors.

Moreover, in the method for manufacturing a mirror structure using the first mold and the second mold, in the adherence step, shapes of the reflecting surfaces of the plurality of mirrors may be formed so that a portion of a rotation symmetry surface which is the target three-dimensional curved surface is formed on all reflecting surfaces of the plurality of mirrors and a rotation symmetry axis of the rotation symmetry surface exists among the plurality of mirrors.

When a direction of an optical axis of the mirror structure is controlled by a driving device and light is radiated from the sun carrying out diurnal motion to the fixed heat receiver, if the rotation shafts becoming the references of the rotation of the plurality of mirrors exist at positions separated from the optical axis, the control of the direction of the optical axis is considerably complicated. In the method for manufacturing, the rotation symmetry axis of the rotation symmetry surface becomes the optical axis of the mirror structure, and the optical axis exists among the plurality of mirrors. Accordingly, in the method for manufacturing, when the mirror structure is rotated with the optical axis as the center, the rotation shaft becoming a reference of the rotation can be disposed among the plurality of mirrors, and the control of the direction of the optical axis when light is radiated from the sun carrying out diurnal motion to the fixed heat receiver can be simplified.

Moreover, in the method for manufacturing, when the rotation symmetry surface is the paraboloid of revolution, the mirror does not exist around the rotation symmetry axis having the largest curvature in the paraboloid of revolution. Accordingly, forcing unreasonable elastic deformation to the mirror in the adherence step can be avoided.

In addition, in the method for manufacturing a mirror structure, the adhesive agent which adheres to the mirror and the rear plate may be at least partly an elastic adhesive agent.

In the method for manufacturing, a thermal expansion difference between the mirror and the rear plate due to a difference between a thermal expansion coefficient of the mirror and a thermal expansion coefficient of the rear plate can be absorbed.

According to another aspect of the present invention, there is provided a mirror structure that reflects solar light and radiates the solar light to a heat receiver, the structure including: a mirror that reflects the solar light; a rear plate that supports a rear surface of the mirror; and a support frame that is disposed on a rear surface of the rear plate, in which the mirror, the rear plate, and the support frame are joined to each another with the mirror, the rear plate, and the support frame elastically deformed so that a reflecting surface of the mirror forms a target three-dimensional curved surface, and the elastically deformed condition is maintained.

In the mirror structure, the elastically deformed states of the mirror, the rear plate, and the support beam member are maintained, and one rigid body in which the mirror, the rear plate, and the support frame are integrally formed is configured. That is, in the mirror structure, in the step in which the mirror, the rear plate, and the support frame are integrated with one another, the overall stiffness is initially secured. Accordingly, in the mirror structure, each of the mirror, the rear plate, and the support frame does not need high stiffness, and thus, weight reduction of the mirror structure can be improved.

In addition, in the mirror structure, the mirror and the rear plate may be joined to each other by adhesive agent, and the adhesive agent adhering the mirror and the rear plate may be at least partly an elastic adhesive agent.

In the mirror structure, a thermal expansion difference between the mirror and the rear plate due to a difference between a thermal expansion coefficient of the mirror and a thermal expansion coefficient of the rear plate can be absorbed.

Moreover, in the mirror structure, the mirror structure may include a plurality of mirrors, and a portion of a rotation symmetry surface which is the target three-dimensional curved surface may be formed from all reflecting surfaces of the plurality of mirrors, and a rotation symmetry axis of the rotation symmetry surface may exist between the plurality of mirrors.

When a direction of an optical axis of the mirror structure is controlled by a driving device and light is radiated from the sun carrying out diurnal motion to the fixed heat receiver, if the rotation shafts becoming the references of the rotation of the plurality of mirrors exist at positions separated from the optical axis, the control of the direction of the optical axis is considerably complicated. In the mirror structure, the rotation symmetry axis of the rotation symmetry surface becomes the optical axis of the mirror structure, and the optical axis exists among the plurality of mirrors. Accordingly, in the mirror structure, when the mirror structure is rotated with the optical axis as the center, the rotation shaft becoming a reference of the rotation can be disposed among the plurality of mirrors, and the control of the direction of the optical axis when light is radiated from the sun carrying out diurnal motion to the fixed heat receiver can be simplified.

In this case, the support frame may include a plurality of support beam members which extend in a radiation direction to the rotation symmetry axis and support the rear plate, and the plurality of support beam members may be elastically deformed.

In the mirror structure, since the mirror and the rear plate can be effectively supported by the plurality of support beam members, the number of components of the support frame can be decreased, and a light member can be used as the member configuring the support frame. Accordingly, weight reduction of the mirror structure can be improved.

According to still another aspect of the present invention, there is provided a light collection device, including: the mirror structure; and a driving device that coordinates the mirror of the mirror structure in a target direction.

Since the light collection device also includes the mirror structure, weight reduction of the mirror structure can be improved.

According to still another aspect of the present invention, there is provided a heat collection facility including the light collection device; and a heat receiver that heats a medium by solar light collected by the light collection device.

According to still another aspect of the present invention, there is provided a solar thermal power generation facility, including: the light collection device; a heat receiver that heats a medium by solar light collected by the light collection device; a turbine that is driven by the medium heated in the heat receiver; and a generator that generates electricity by driving of the turbine.

Advantageous Effects of Invention

In the present invention, weight reduction of a mirror structure can be improved. Therefore, according to the present invention, transport or field assembly of the mirror structure can be easily performed, and thus, a driving force when the mirror structure is directed to a target direction can be decreased.

DESCRIPTION OF EMBODIMENTS

Next, an embodiment according to a light collection device of the present invention will be described in detail with reference to the drawings. Moreover, the embodiment described below is an appropriate specific example of the light collection device according to the present invention, and is not limited to aspects shown in this embodiment. Moreover, components in the embodiment described below can be appropriately replaced by existing components or the like, and various variations including combinations with other existing components can be performed. Accordingly, descriptions of the embodiment shown below do not limit the content of the present invention described in Claims.

Figure 1:
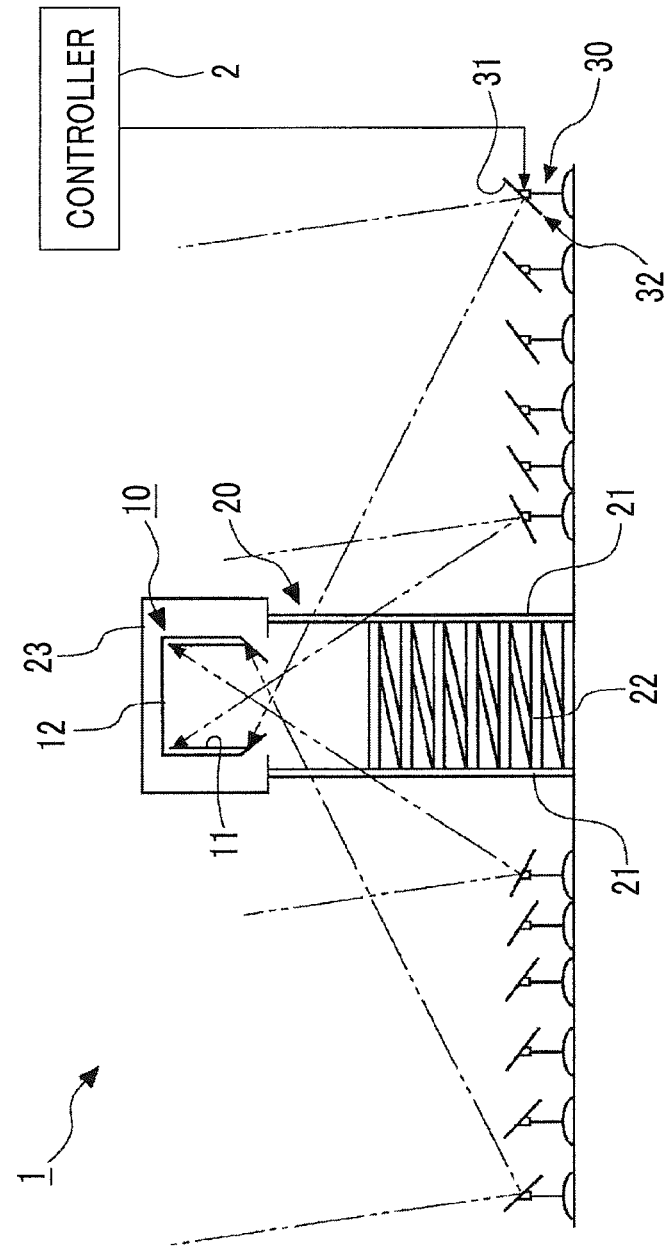
FIG. 1 is an explanatory view showing a configuration of a heat collection facility according to an embodiment of the present invention.

As shown in FIG. 1, a heat collection facility 1 of the present embodiment includes a heat receiver 10 to which solar light is radiated, a tower facility 20 in which the heat receiver 10 is fixed to the upper portion, heliostats 30 which are disposed in plural around the tower facility 20 and are light collection devices which radiate the solar light to the heat receiver 10 by reflecting solar light by mirrors 31, and a controller 2 which controls the plurality of heliostats 30.

The heat receiver 10 includes a heat receiving unit 11 to which the solar light is radiated, and a casing 12 that covers the heat receiving unit 11. An operation fluid such as water or air is supplied to the inner portion of the heat receiving unit 11, and the operation fluid is heated by the heat from the solar light. For example, when the operation fluid is air, although it is not shown, the heat collection facility 1 further includes a gas turbine which is driven by the heated air and a generator which generates electricity by the driving of the gas turbine, and, a solar thermal power generation facility can be configured. Moreover, in this example, the heat energy from the heat receiver 10 is used to generate electric energy. However, the heat energy may be used to generate steam, and the steam may be used to generate electric energy.

Figure 2:
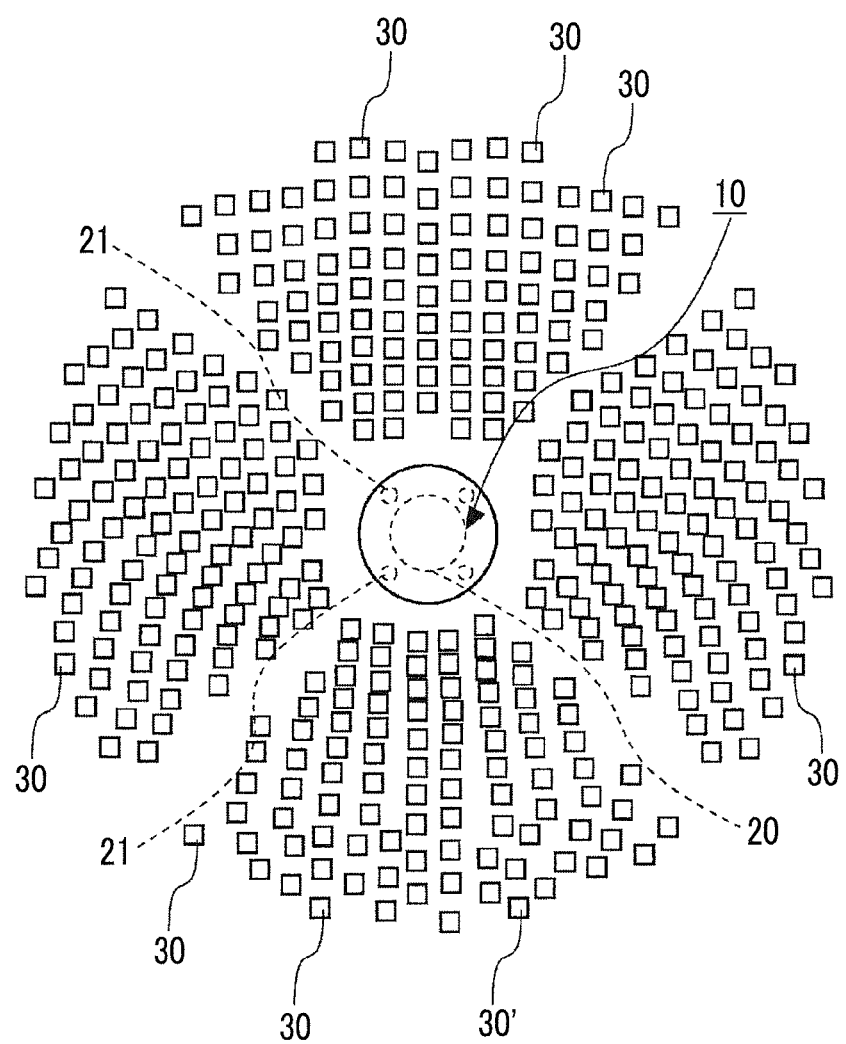
FIG. 2 is a plan view of the heat collection facility according to the embodiment of the present invention.

As shown in FIG. 2, the plurality of heliostats 30 are scattered in a ring-shaped region with the tower facility 20 as the center. In other words, the plurality of heliostats 30 are disposed 360° in the circumferential direction with the tower facility 20 as the center, and are also disposed in separating and approaching directions based on the tower facility 20. Moreover, here, the plurality of heliostats 30 are disposed in the ring-shaped region with the tower facility 20 as the center. However, the plurality of heliostats 30 may be disposed in a fan shaped region or a rectangular region with the tower facility 20 as the center.

As shown in FIG. 1, the tower facility 20 includes four struts 21 that extend in a vertical direction, a plurality of tower beams 22 that connect the four struts 21 to one another, and a storage room 23 that stores the heat receiver 10. The struts 21 and the tower beams 22 of the tower facility 20 are disposed so as not to exist on a light path of the solar light which is reflected by the mirrors 31 of the heliostats 30 and is directed to the heat receiver 10.

Figure 3:
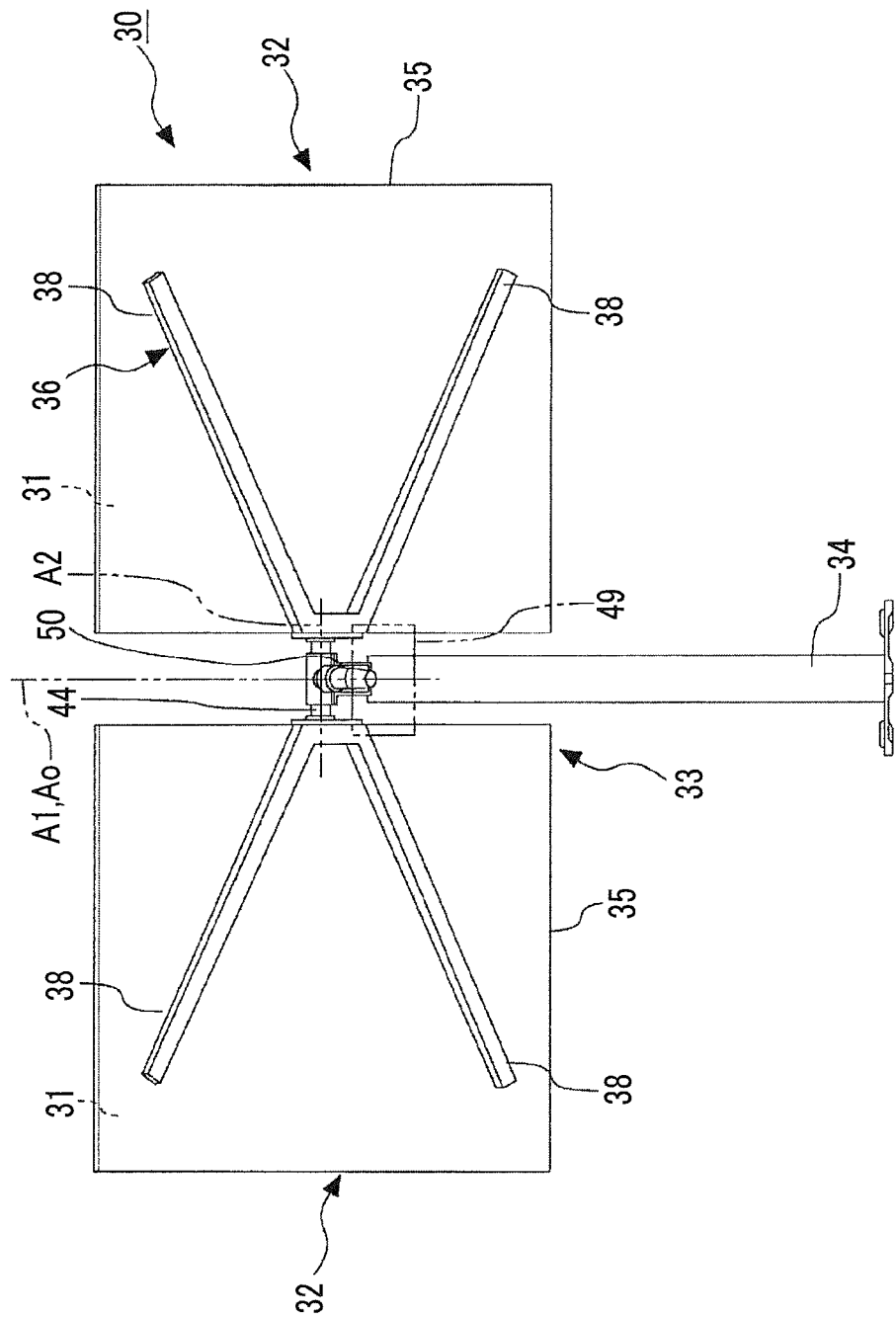
FIG. 3 is a rear view of a heliostat (light collection device) according to the embodiment of the present invention.

As shown in FIG. 3, the heliostat 30 includes mirror structures 32 having mirrors 31 which reflect the solar light, a driving device 33 that coordinates the mirrors 31 of the mirror structures 32 in the target direction, and a support frame 34 that supports the mirror structures and the driving device.

As shown FIGS. 4 to 7, the mirror structures 32 include a pair of right and left mirrors 31, rear plates that support the rear surfaces of mirrors 31, and support frames 36 that support the rear surfaces of the rear plates 35.

Figure 8A:
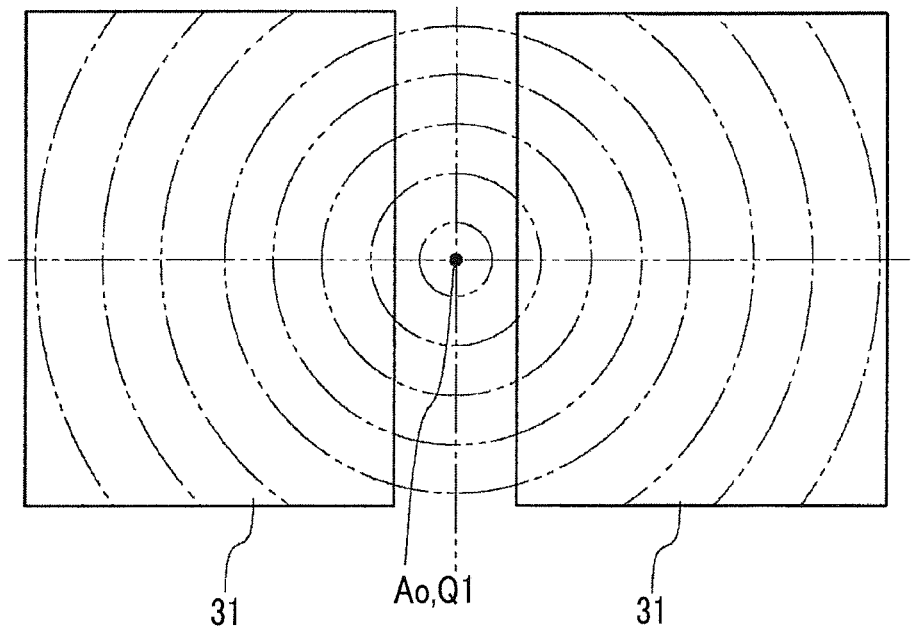
FIG. 8A is an explanatory view showing the mirror structure according to the embodiment of the present invention and is an explanatory view showing a front surface of the mirror structure.
Figure 8B:
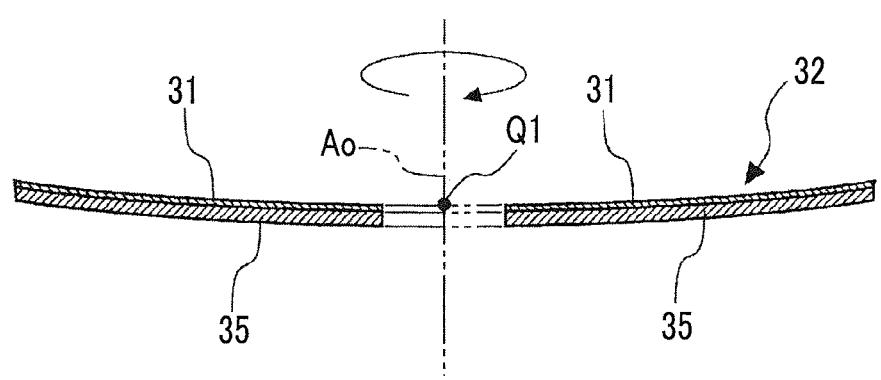
FIG. 8B is an explanatory view showing the mirror structure according to the embodiment of the present invention and is an explanatory view showing a cross-section surface of the mirror structure.
Figure 9:
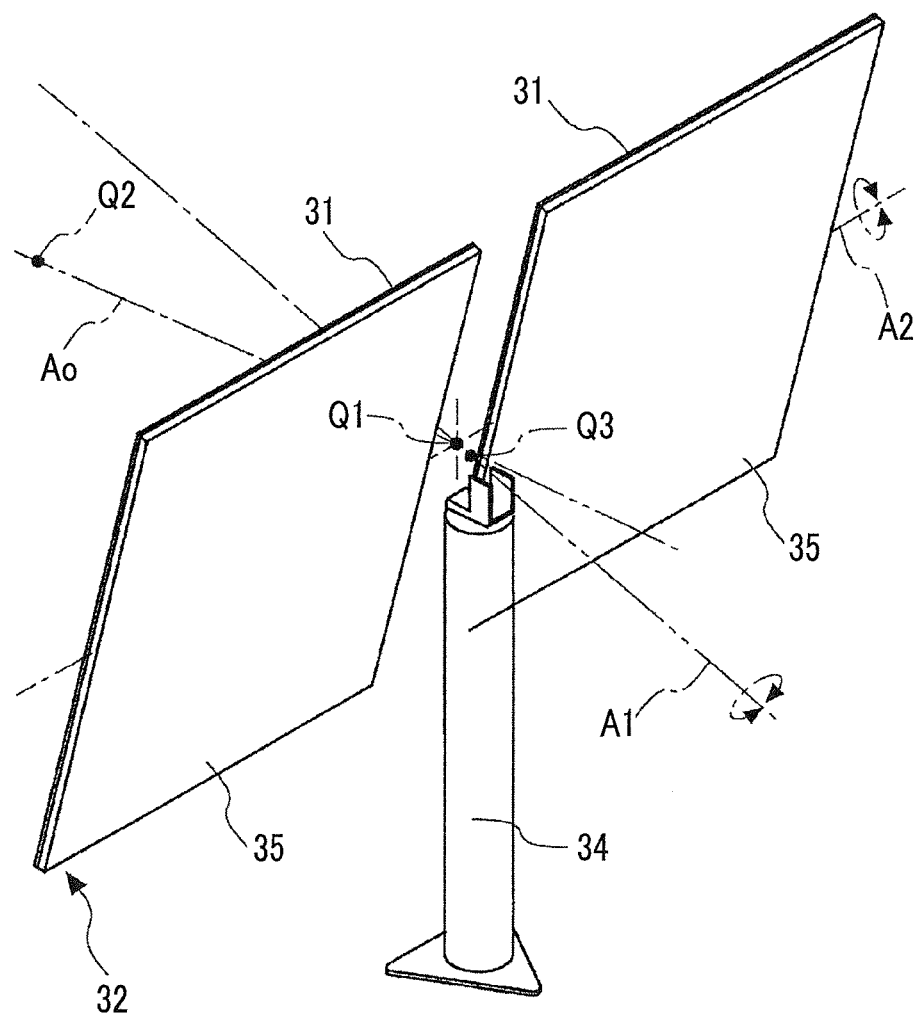
FIG. 9 is an explanatory view showing each rotation axis and each optical axis of the heliostat according to the embodiment of the present invention.

As shown in FIGS. 8A and 8B, two sheets of mirrors 31 are the same size as each other, and are formed in the same rectangular plate shape in a front view. In the mirror structure 32 of the present embodiment, the reflecting surfaces of the two sheets of mirrors 31 form one rotation symmetry surface, specifically, a portion of a paraboloid of revolution. Two sheets of mirrors 31 are separated so that an apex of the paraboloid of revolution is positioned at a middle point of two mirrors, and are symmetrical right and left as shown. Hereinafter, as shown in FIGS. 8A, 8B, and 9, in the present embodiment, the apex of the paraboloid of revolution is set to a principal point Q1 of the mirror structure 32, and an axis, which passes through the principal point Q1 and extends in a normal direction with respect to the reflecting surface, that is, a rotational center axis of a rotation symmetric surface passing through the principal point Q1 and a focus Q2 of the paraboloid of revolution is set to an optical axis Ao of the mirror structure 32. Moreover, the focus Q2 in FIG. 9 does not show an actual distance from the principal point Q1.

As shown in FIGS. 3 and 9, the driving device 33 rotates the mirror structure 32 with a second rotation axis A2 which passes through the principal point Q1 of the mirror structure 32 and is perpendicular to the optical axis Ao, and a first rotation axis A1 which passes through the principal point Q1 of the mirror structure 32 and is perpendicular to the second rotation axis A2, as the centers. Accordingly, in the present embodiment, an intersection between the first rotation axis A1 and the second rotation axis A2 is positioned on the principal point Q1 of the mirror structure 32.

As shown in FIG. 3, the driving device 33 includes a first rotation shaft 50 that is supported by the support frame 34 so as to be rotatable with the first rotation axis A1 as the central axis, a second rotation shaft 44 that is attached to the first rotation shaft 50 so as to be rotatable with the second rotation axis A2 as the central axis, and a drive mechanism 49 that rotates the rotation shafts 50 and 44 independently and changes the angle of the first rotation axis A1 with respect to a horizontal surface.

Figure 6:
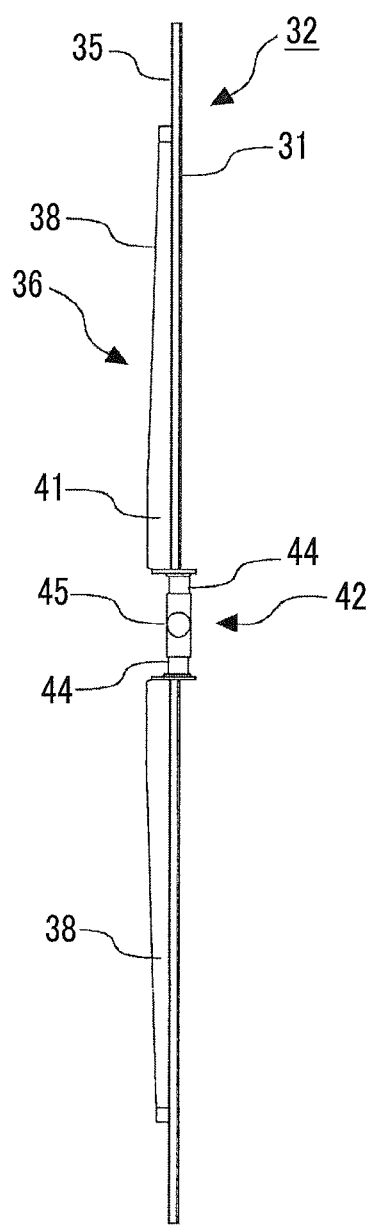
FIG. 6 is a bottom view of the mirror structure according to the embodiment of the present invention.

Next, the mirror structure 32 will be described. As shown in FIGS. 6 and 8B, the rear plate 35 of the mirror structure 32 adheres to the rear surface of each mirror 31, and thus, supports each mirror 31 from the rear surface side. The rear plate 35 is formed of a thin steel plate, a thin aluminum alloy plate, a resin plate, or the like, and is formed to have uneven shapes in the plate thickness direction. The rear plate 35 adheres to the rear surface of the mirror 31 via an adhesive agent at an apex of a convex portion of the plate. In order to absorb a thermal expansion difference due to a difference between a thermal expansion coefficient of the mirror 31 and a thermal expansion coefficient of the rear plate 35, for example, preferably, the adhesive agent adhering to the mirror 31 and the rear plate 35 is at least partly a silicon based or a modified silicon based elastic adhesive agent having elasticity.

Figure 4:
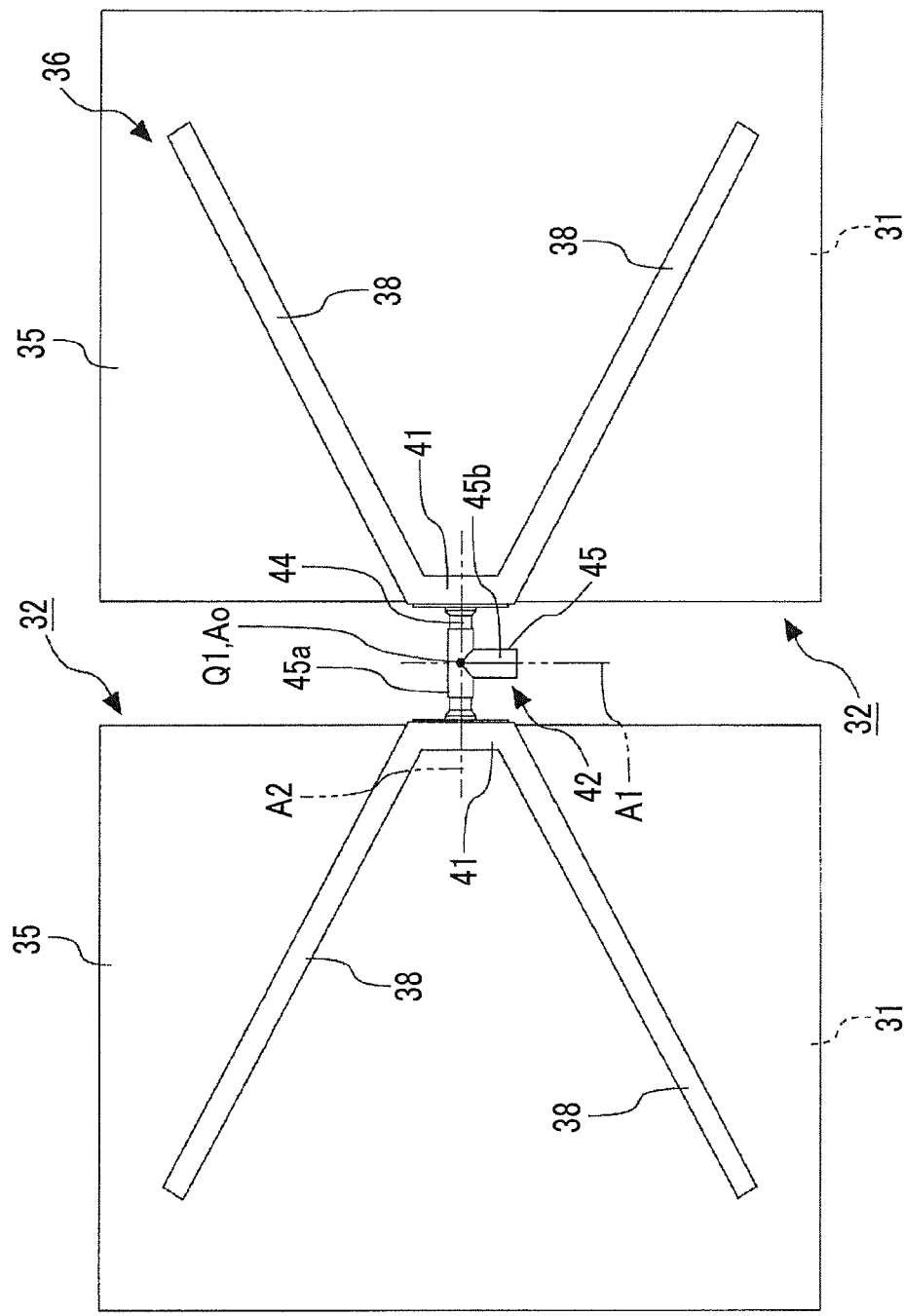
FIG. 4 is a rear view of a mirror structure according to the embodiment of the present invention.

As described above, the support frame 36 is disposed on the rear surface of the rear plate 35. As shown in FIG. 4, the support frame 36 includes a plurality of support beam members 38 that are joined to the rear surface of each rear plate 35, and a connection member 42 that connects the plurality of support beam members 38 to one another.

The plurality of support beam members 38 are joined to the rear plate 35 so that the longitudinal directions of the support beam members from the optical axis Ao of the mirror structure 32 are directed in a radiation direction. Specifically, in the present embodiment, two support beam members 38 are provided with respect to one sheet of rear plate 35. Each support beam member 38 is provided on the rear plate 35 so that one end is directed to the optical axis Ao side, the other end is directed to the corner side of the rear plate 35, that is, to the corner side of the mirror 31, and two support beam members 38 are formed in a V shape. Moreover, here, two support beam members 38 are provided with respect to one sheet of rear plate 35, that is, one sheet of mirror 31. However, from the viewpoint of strength, three or more support beam members 38 may be provided.

As shown in FIGS. 3 and 4, in the support beam member 38, the cross-sectional shape is a groove type shape or a square pipe type shape. Moreover, as the support beam member 38 is distant from the optical axis Ao of the mirror structure 32, in other words, as the support beam member is directed to the corner side of the rear plate 35, the thickness of the support beam member is decreased, and thus, weight reduction is improved. In addition, the width of the support beam member 38 may be narrowed (may be decreased) as the support beam member becomes more distant from the optical axis Ao of the mirror structure 32. That is, in the support beam member 38, in a cross-sectional area perpendicular to the radiation direction in which the support beam member 38 extends, the cross-sectional area at a position distant from the optical axis Ao may be smaller than the cross-sectional area at a position close to the optical axis Ao.

As shown in FIGS. 4 to 7, the connection member 42 includes a connection beam 41 that connects two support beam members 38 of one sheet of rear plate 35 to each other, a columnar shaft 44 that connects one rear plate 35 side connection beam 41 and the other rear plate 35 side connection beam 41, and a T-shaped pipe 45 through which the shaft 44 is inserted.

The central axis of the shaft 44, which connects the connection beams 41 to each other, passes through the principal point Q1 which is perpendicular to the optical axis Ao and is a vertex of the paraboloid of revolution of the mirror structure 32. Moreover, the shaft 44 enters both arm portions 45a of the T-shaped pipe 45, and is rotatably supported around the central axis of the shaft 44 by a bearing (not shown) provided in the inner portion of the T-shaped pipe 45. In the present embodiment, the shaft 44 configures the above-described second rotation shaft, and the central axis of the shaft 44 configures the second rotation axis A2. Accordingly, hereinafter, the shaft 44 is referred to as the second rotation shaft 44.

Figure 5:
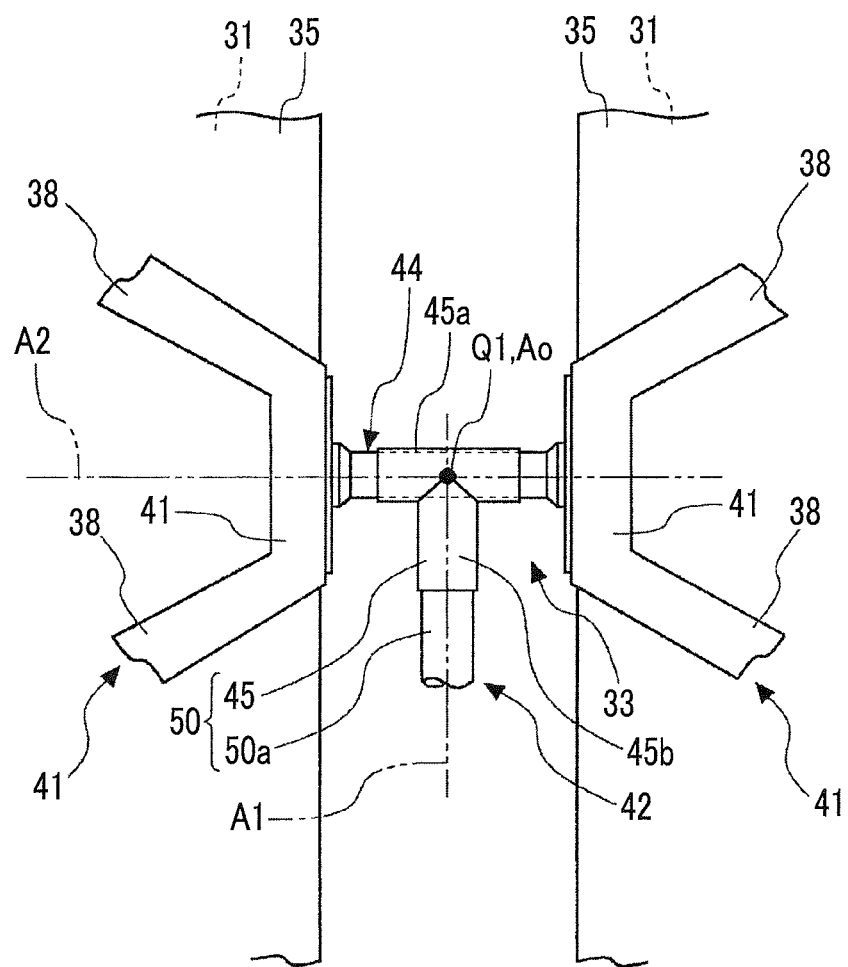
FIG. 5 is a main portion rear view of the mirror structure according to the embodiment of the present invention.

As shown in FIG. 5, the first rotation shaft 50 of the driving device 33 includes the above-described T-shaped pipe 45, and a first rotation shaft main body 50a that is inserted into a leg portion 45b of the T-shaped pipe 45 to be fixed. The central axis of the first rotation shaft main body 50a configures the first rotation axis A1. The first rotation shaft 50 is supported by the support frame 34 shown in FIG. 3 so as to be rotatable with the first rotation axis A1 as the center and to change the angle with respect to the horizontal surface. The rotation and the changing of the angle with respect to the horizontal surface in the first rotation shaft 50 are performed by the drive mechanism 49 shown in FIG. 3.

As described above, in the present embodiment, the second rotation shaft 44 and the T-shaped pipe 45 of the connection member 42, which is a component of the mirror structure 32, also are components for the driving device 33.

Figure 7:
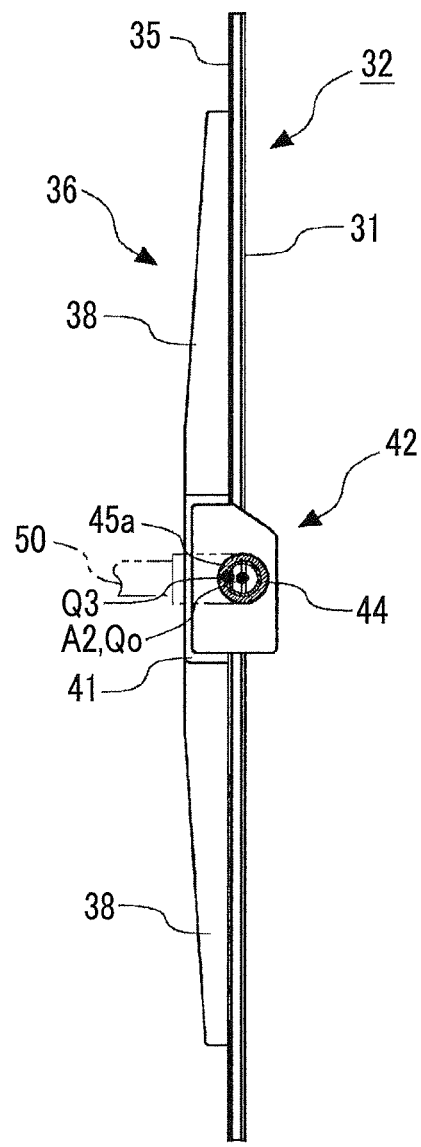
FIG. 7 is a side cross-sectional view of the mirror structure according to the embodiment of the present invention.

The mirror structure 32 described above is point symmetric based on the optical axis Ao. Moreover, as shown in FIG. 9, the position of the center of gravity Q3 of the mirror structure 32 is positioned on the optical axis Ao of the mirror structure 32, and is positioned at a side opposite to the focus Q2 based on the principal point Q1. A distance of the center of gravity Q3 from the principal point Q1 is very short, and as shown in FIG. 7, the center of gravity exists inside the second rotation shaft 44 which has the second rotation axis A2 passing through the principal point Q1 as the central axis, and inside the first rotation shaft 50 which has the first rotation axis A1 passing through the principal point Q1 as the central axis.

Accordingly, in the present embodiment, even when the mirror structure 32 rotates around the first rotation axis A1 or rotates around the second rotation axis A2, movement in the position of the center of gravity of the mirror structure 32 does not occur at all. Moreover, due to weight of the mirror structure 32 itself, moment which rotates the mirror structure 32 itself around the first rotation axis A1 or the second rotation axis A2 does not occur at all.

In addition, in the present embodiment, the driving force for rotating the mirror structure 32 can be decreased, and even when stiffness of the first rotation shaft 50 or the second rotation shaft 44, stiffness of the support structure including the bearing which rotatably supports the rotation shafts 50 and 44, or the like is decreased, the mirror structure 32 can be stably supported.

In this way, in the present embodiment, since the stiffness of the first rotation shaft 50, the second rotation shaft 44, or the like can be decreased, a decrease in the size and weight reduction of the shafts 50 and 44 can be improved.

In addition, in the present embodiment, the principal point Q1 of the mirror structure 32 is positioned at an intersection between the first rotation axis A1 and the second rotation axis A2. Accordingly, in the present embodiment, even when the mirror structure 32 rotates around the first rotation axis A1 and rotates around the second rotation axis A2, the principal point Q1 of the mirror structure 32 does not move, and a relative position between the principal point Q1 of the mirror structure 32 and the heat receiving unit 11 of the heat receiver 10 is not changed.

Accordingly, in the present embodiment, even when the mirror structure 32 is rotated, the solar light reflected by two sheets of mirrors 31 of the mirror structure 32 can be continuously and correctly radiated to the heat receiving unit 11 of the heat receiver 10. In other words, in the present embodiment, since the optical axis Ao exists between two sheets of mirrors 31, when the mirror structure 32 is rotated with the optical axis Ao as the center, the rotation shaft becoming a reference of the rotation can be disposed among the plurality of mirrors, and the control of the direction of the optical axis Ao when light is radiated from the sun carrying out diurnal motion to the fixed heat receiver can be simplified.

Moreover, in the present embodiment, the plurality of support beam members 38 joined to the rear surface of the rear plate 35 extend in the radiation direction with respect to the optical axis Ao of the mirror structure 32, that is, a direction in which curvature of the mirror 31 is changed, and the mirror 31 and the rear plate 35 are supported in accordance with the change of the curvature, and thus, can be supported extremely effectively. Accordingly, in the present embodiment, the number of components of the support frame 36 can be decreased, a light member can be used as the member configuring the support frame 36, and weight reduction of the mirror structure 32 can be improved.

Figure 10:
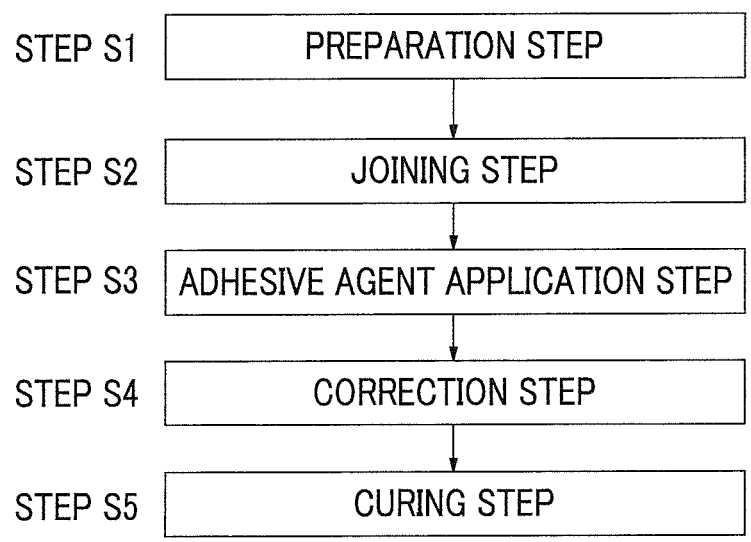
FIG. 10 is a flowchart showing a manufacturing procedure of the mirror structure according to the embodiment of the present invention.

Next, a manufacturing procedure of the above-described mirror structure 32 will be described according to a flow-chart shown in FIG. 10.

(Preparation Step <Step S1>)

Figure 11:
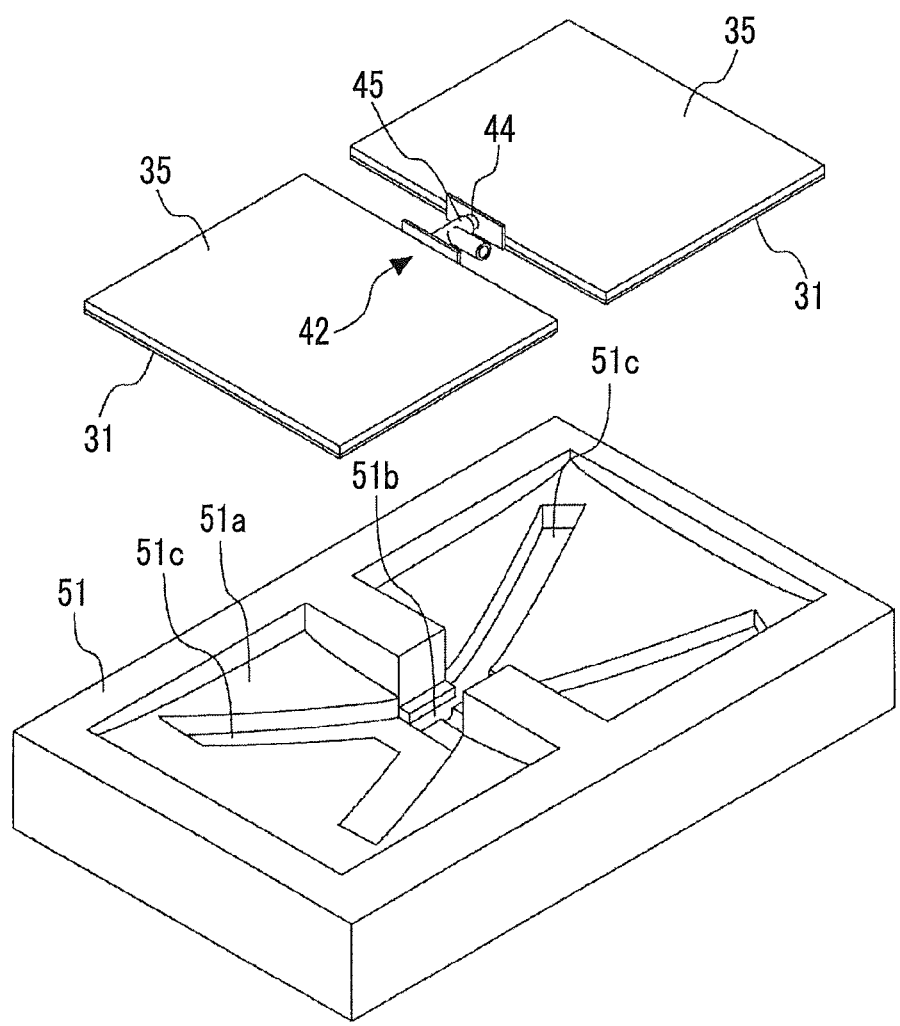
FIG. 11 is an explanatory view showing a relationship between a lower mold and the mirror structure before correction in a manufacturing process according to the embodiment of the present invention.
Figure 12:
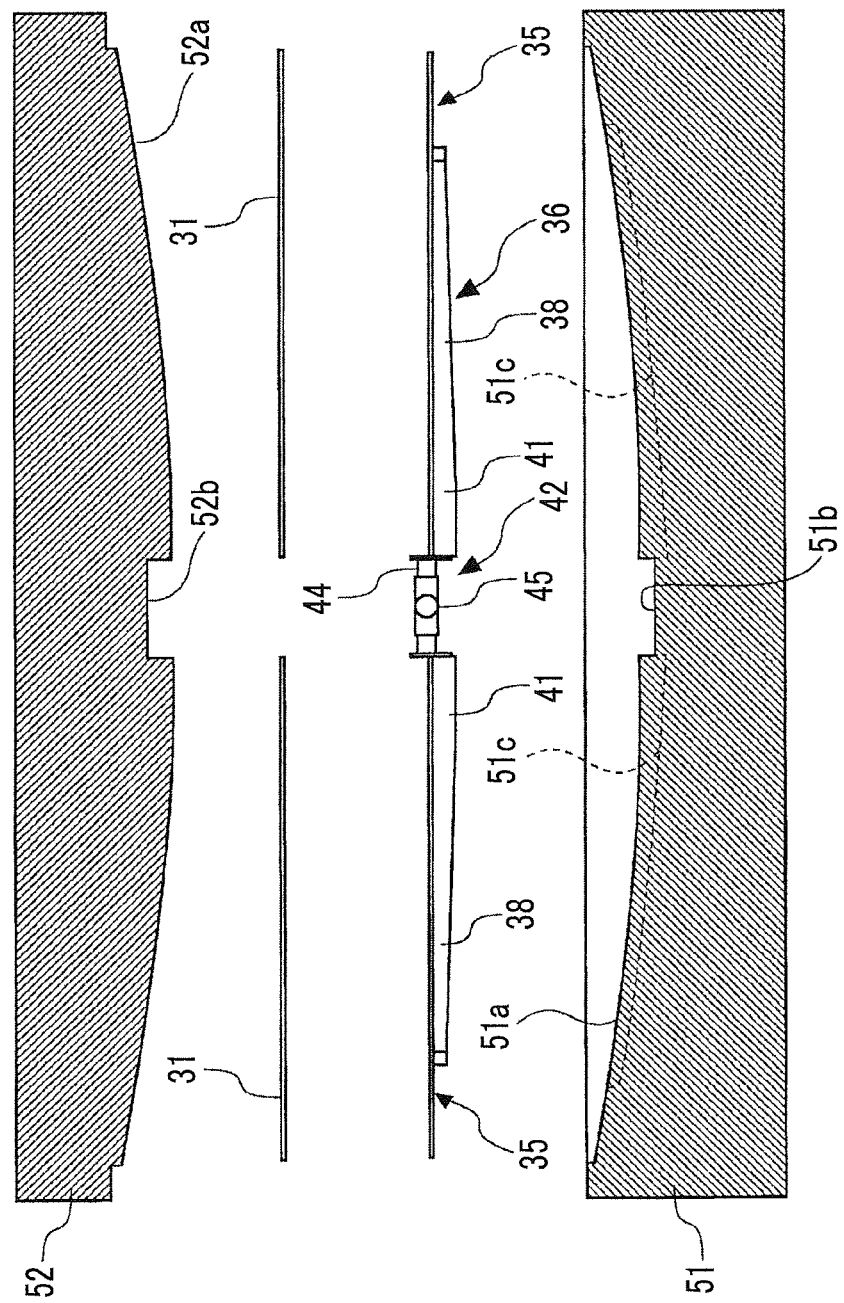
FIG. 12 is an explanatory view of a correction step of the manufacturing process according to the embodiment of the present invention.

In a preparation step, two sheets of mirrors 31, two sheets of rear plates 35, and the above-described support frame 36 are prepared. At this time, all reflecting surfaces of two sheets of mirrors 31 are flat. Moreover, although an uneven shape is formed on the rear plate 35, the stiffness of the rear plate 35 itself is extremely low, and thus, the rear plate 35 is changed by its own weight. Moreover, as shown in FIGS. 11 and 12, an upper mold (first mold) 52 and a lower mold (second mold) 51, which deform the mirror 31, the rear plate 35, and the support frame 36 to maintain the deformed state, are also prepared.

The upper mold 52 includes a mirror opposing surface 52a opposing two sheets of mirrors 31, and a rotation shaft opposing surface 52b opposing the second rotation shaft 44 and the T-shaped pipe 45 of the support frame 36. The mirror opposing surface 52a has a convex shape corresponding to the paraboloid of revolution which is a target shape of the reflecting surfaces of two sheets of mirrors 31. Moreover, the rotation shaft opposing surface 52b has a shape corresponding to the shape of the second rotation shaft 44 or the T-shaped pipe 45.

The lower mold 51 includes a rear plate opposing surface 51a opposing two sheets of rear plates 35, a rotation shaft opposing surface 51b opposing the second rotation shaft 44 and the T-shaped pipe 45 of the support frame 36, and a support beam opposing surface 51c opposing the support beam member 38 of the support frame 36. The rear plate opposing surface 51a has a concave shape corresponding to the paraboloid of revolution which is a target shape of the reflecting surfaces of two sheets of mirrors 31. Moreover, the rotation shaft opposing surface 51b has the shape corresponding to the shape of the second rotation shaft 44 or the T-shaped pipe 45. In addition, similar to the rear plate opposing surface 51a, the support beam opposing surface 51c has a concave shape corresponding to the paraboloid of revolution which is a target shape of the reflecting surfaces of two sheets of mirrors 31. However, since the support beam opposing surface 51c is a surface contacting the support beam member 38, the support beam opposing surface is formed at the position which is concaved from the rear plate opposing surface 51a contacting the rear plate 35.

(Joining Step <Step S2>)

Subsequently, two sheets of rear plates 35 are joined to the support frame 36. At this time, the support beam member 38 is joined to the rear surface of the rear plate 35 by welding or bonding.

(Adhesive Agent Application Step <Step S3>)

Subsequently, the support frame 36, to which two sheets of rear plates 35 are joined, is set to the lower mold 51.

At this time, the second rotation shaft 44 and the T-shaped pipe 45 of the support frame 36 oppose the rotation shaft opposing surface 51b of the lower mold 51, and the support beam member 38 of the support frame 36 opposes the support beam opposing surface 51c. Moreover, adhesive agent is applied to apexes of the plurality of convex portions in two sheets of rear plates 35. At this time, in the process in which the adhesive agent is applied to the vertexes of the plurality of convex portions, for example, the adhesive may be rapidly applied by a dispenser, a robot arm, or the like to the convex portions so that the convex portions where the adhesive had previously been applied are not dried and cured.

(Correction Step (Step S4>)

Subsequently, after the flat mirror 31 is placed on each of two sheets of rear plates 35 joined to the support frame 36 set to the lower mold 51, the upper mold 52 opposes the lower mold 51, and the upper mold 52 is pressed to the lower mold 51. As a result, the mirror 31, the rear plate 35, and the support beam member 38 are elastically deformed, and thus, are corrected in accordance with the shapes of the upper mold 52 and the lower mold 51. That is, reflecting surfaces of two sheets of mirrors 31 are formed in the shape configuring one paraboloid of revolution, and thus, the rear plate 35 and the support beam members 38 are formed in the shapes corresponding to the shape of the mirror 31. On the other hand, the second rotation shaft 44 and the T-shaped pipe of the support frame 36 are not deformed, and thus, maintain the shapes held before the upper mold 52 is pressed to the lower mold 51.

(Curing Step <Step S5>)

Moreover, the correction state in the correction step is maintained, that is, the state where the mirror 31, the rear plate 35, and the support beam member 38 are elastically deformed is maintained, the adhesive agent is cured, and the mirror 31 and the rear plate 35 are held in place until the mirror and the rear plate completely adhere to each other. Moreover, here, since the elastic adhesive agent is used as the adhesive agent adhering to at least partly the mirror 31 and the rear plate 35, even when the adhesive agent is cured, the elasticity of the mirror 31 or the rear plate 35 is not removed.

If the curing step ends, the upper mold 52 is removed from the lower mold 51, the mirror structure 32 in which two sheets of mirrors 31, two sheets of rear plates 35, and the support frame 36 are integrally formed is extracted from the inner portion of the lower mold 51.

As described above, the mirror structure 32 is completed. Moreover, in the manufacturing procedure of the above-described mirror structure 32, the steps of Step S3 to Step S5 configure a adherence step.

In the completed mirror structure 32, the elastically deformed states of the mirror 31, the rear plate 35, and the support beam member 38 are maintained by the curing of the adhesive agent, and one rigid body in which the mirror 31, the rear plate 35, and the support frame 36 are integrally formed is configured. That is, in the present embodiment, in the step in which the mirror 31, the rear plate 35, and the support frame 36 are integrated with one another, the stiffness of the mirror structure 32 is initially secured.

Accordingly, in the present embodiment, each of the mirror 31, the rear plate 35, and the support frame 36 does not need high stiffness, and thus, weight reduction of the mirror structure 32 can be improved. Moreover, in the present embodiment, as described above, since the mirror 31 and the rear plate 35 are effectively supported by the support beam member 38, the weight reduction of the mirror structure 32 can be realized.

Therefore, in the present embodiment, transport or field assembly of the mirror structure 32 can be easily performed, and the driving force when the mirror structure is directed to the target direction by the driving device 33 can be decreased.

In addition, in the present embodiment, compared to a case where the plurality of mirrors having a target three-dimensional curved surface previously are attached to the support frame or the like, labor processing of each mirror can be omitted, the direction or the positional adjustment of each mirror 31 with respect to the support frame 36 can be performed extremely easily, and thus, the manufacturing step can simplified. Moreover, in the present embodiment, the target three-dimensional curved surface can be formed very accurately on the reflecting surfaces of the plurality of mirrors. Moreover, in the present embodiment, since the mirror 31 does not exist around the rotation symmetry axis having the largest curvature in the paraboloid of revolution which is the target three-dimensional curved surface, and thus, forcing unreasonable elastic deformation to the mirror 31 in the correction step (S4) can be avoided.

In addition, in above-described embodiment, the mirror structure 32 having two sheets of mirrors 31 is exemplified. However, the present invention is not limited to this, and can be applied to the mirror structure having one sheet of mirror or the mirror structure having three sheets or more of mirrors. In addition, in the above-described embodiment, the mirror structure 32 having a rectangular plate shaped mirror 31 is exemplified. However, the present invention is not limited to this, and may be applied to the mirror structure having mirrors of other shapes such as a semicircular plate shape.

REFERENCE SIGNS LIST

Q1 . . . principal point, Q2 . . . focus, Q3 . . . center of gravity, Ao . . . optical axis, A1 . . . first rotation axis, A2 . . . second rotation axis, 1 . . . heat collection facility, 2 . . . controller, 10 . . . heat receiver, 11 . . . heat receiving unit, 20 . . . tower facility, 30 . . . heliostat (light collection device), 31 . . . mirror, 32 . . . mirror structure, 33 . . . driving device, 34 . . . support frame, 35 . . . rear plate, 36 . . . support frame, 38 . . . support beam member, 40 . . . support beam, 42 . . . connection member, 44 . . . second rotation shaft, 45 . . . T-shaped pipe, 49 . . . drive mechanism, 50 . . . first rotation shaft, 51 . . . lower mold (second mold), 52 . . . upper mold (first mold)

The invention claimed is:

1. A method for manufacturing a mirror structure that comprises plate-shaped first and second mirrors each having a reflecting surface which reflects solar light and forms one rotation symmetry surface, a plate-shaped first rear plate which supports a rear surface of the plate-shaped first mirror, a plate-shaped second rear plate which supports a rear surface of the plate-shaped second mirror, and a support frame which is disposed on rear surfaces of the plate-shaped first and second rear plates, the mirror structure that radiates the solar light to a heat receiver using the reflecting surfaces of the plate-shaped first and second mirrors, the method comprising:

a joining step of joining the plate-shaped first and second rear plates and the support frame; and an adherence step of disposing an adhesive agent between the plate-shaped first and second mirrors and the plate-shaped first and second rear plates, of pressing a first mold which contacts the first and second mirrors to a second mold which contacts the first and second rear plates and the support frame so that the first mold opposes the second mold, of elastically deforming the plate-shaped first and second mirrors, the plate-shaped first and second rear plates, and the support frame so that the reflecting surfaces of the plate-shaped first and second mirrors form one three-dimensional curved surface, and of maintaining the elastically deformed condition of the plate-shaped first and second mirrors, the plate-shaped first and second rear plates and the support frame until the adhesive agent is cured, wherein the support frame comprises a columnar shaft that connects together the first rear plate and the second rear plate, and wherein the columnar shaft is disposed between the first rear plate and the second rear plate.

2. The method for manufacturing a mirror structure according to claim 1, wherein in the adherence step, a shape of the reflecting surfaces of the first and second mirrors is formed so that a portion of the three-dimensional curved surface is formed on all reflecting surfaces of the first and second mirrors.

3. The method for manufacturing a mirror structure according to claim 2, wherein in the adherence step, a shape of the reflecting surfaces of the first and second mirrors is formed so that a portion of a rotation symmetry surface which is the three-dimensional curved surface is formed on all reflecting surfaces of the first and second mirrors and a rotation symmetry axis of the rotation symmetry surface exists among the first and second mirrors.

4. The method for manufacturing a mirror structure according to claim 1, wherein the adhesive agent is an elastic adhesive agent.

5. A mirror structure that radiates solar light to a heat receiver, the structure comprising:

first and second mirrors each having a reflecting surface that reflects the solar light and forms one rotation symmetry surface;

a first rear plate that supports a rear surface of the first mirror;

a second rear plate that supports a rear surface of the second mirror; and a support frame that is disposed on rear surfaces of the first and second rear plates, wherein the first and second mirrors, the first and second rear plates, and the support frame are joined to each another to elastically deform so that the reflecting surfaces of the first and second mirrors form one three-dimensional curved surface, and the elastically deformed condition of the first and second mirrors, the first and second rear plates and the support frame is maintained, wherein the first mirror is joined to the first rear plate by adhesive agent, wherein the second mirror is joined to the second rear plate by adhesive agent, wherein the adhesive agent is elastic adhesive agent, wherein the support frame comprises a columnar shaft that connects the first rear plate and the second rear plate, and wherein the columnar shaft is disposed between the first rear plate and the second rear plate.

6. The mirror structure according to claim 5, wherein a portion of a rotation symmetry surface which is the three-dimensional curved surface is formed from all reflecting surfaces of the first and second mirrors, and wherein a rotation symmetry axis of the rotation symmetry surface exists between the first mirror and the second mirror.

7. The mirror structure according to claim 6, wherein the support frame includes a plurality of support beam members which extends in a radiation direction to the rotation symmetry axis and supports the first and second rear plates, and wherein the plurality of support beam members is elastically deformed.

8. A light collection device, comprising:

the mirror structure according to claim 5; and a driving device that is configured to tilt the first and second mirrors, wherein the driving device comprises:

a first rotation shaft that is rotatable with a first rotation axis as a central axis, wherein the first rotation axis passes through a principal point of the mirror structure;

a second rotation shaft that is attached to the first rotation shaft so as to be rotatable with a second rotation axis as a central axis, wherein the second rotation axis is perpendicular to the first rotation axis; and a drive mechanism that is configured to change angle of the first rotation axis with respect to a horizontal surface.

9. A heat collection facility, comprising:

the light collection device according to claim 8; and a heat receiver that heats a medium by solar light collected by the light collection device.

10. A solar thermal power generation facility, comprising:

the light collection device according to claim 8;

a heat receiver that heats a medium by solar light collected by the light collection device;

a turbine that is driven by the medium heated in the heat receiver; and a generator that generates electricity by driving of the turbine.

\* \* \* \* \*